(12) United States Patent
Oota et al.

(10) Patent No.: US 6,345,019 B1
(45) Date of Patent: *Feb. 5, 2002

(54) DISK DRIVE SYSTEM WITH RELEASING APPARATUS

(75) Inventors: Shinji Oota; Hitoshi Sakaguchi; Kazushi Yoshikawa, all of Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/049,804

(22) Filed: Mar. 27, 1998

(30) Foreign Application Priority Data

Mar. 28, 1997 (JP) .................. 9-078112

(51) Int. Cl.$^7$ ................. G11B 7/00
(52) U.S. Cl. ........... 369/44.32; 369/32; 369/53.39; 369/53.49
(58) Field of Search .............. 369/32, 44.28, 369/44.27, 44.29, 44.32; 360/75, 53.43, 53.39

(56) References Cited

U.S. PATENT DOCUMENTS

| | | | | |
|---|---|---|---|---|
| 4,748,607 A | * | 5/1988 | Nakane | 369/44.28 |
| 5,101,386 A | * | 3/1992 | Kojima et al. | 369/44.28 |
| 5,177,723 A | * | 1/1993 | Yoshikawa | 369/32 |
| 5,442,615 A | * | 8/1995 | Ohsato et al. | 369/44.32 |
| 5,598,390 A | * | 1/1997 | Saitoh et al. | 369/58 |
| 5,642,340 A | * | 6/1997 | Nomura | 369/44.29 |
| 5,682,362 A | * | 10/1997 | Suzuki et al. | 369/32 |

* cited by examiner

*Primary Examiner*—Nabil Hindi
(74) *Attorney, Agent, or Firm*—Frommer Lawrence & Haug LLP; William S. Frommer; Joe H. Shallenburger

(57) ABSTRACT

Disclosed is a thread servo of a disk drive system, in which a slide mechanism is driven on a slide drive signal generated from an error signal of the slide mechanism. When a precursory phenomenon of making unstable the operation of the slide mechanism is detected, the driving operation of the slide mechanism is stopped.

5 Claims, 10 Drawing Sheets

FIG. 2A THREAD POSITION CONTROL SIGNAL CSLp

FIG. 2B THREAD POSITION ERROR SIGNAL SLEp

FIG. 2C TRACKING ERROR

DISK DRIVE SYSTEM WITH RELEASING APPARATUS

BACKGROUND OF THE INVENTION

The present invention relates to a disk drive system for drive of a disk-shaped recording medium such as an optical disk or a magneto-optical disk.

A disk drive system includes a biaxial mechanism for controlling a tracking state of a light spot by driving an objective lens of an optical head on the basis of a tracking error signal obtained from track guide information on a pit train, a groove, and the like, and also includes a slide mechanism for displacing a relative position of the entire optical head to a disk plane in the radial direction of a disk.

As the slide mechanism, there are known a type of moving the entire optical head relative to a disk, and a type of moving a turn table on which a disk is mounted relative to an optical head whose position is fixed.

For a CD system, there is frequently adopted a type of sliding an optical head by a moving mechanism such as a gear system or a linear motor, which is generally called "a thread mechanism". The thread mechanism includes a servo-loop for driving the thread mechanism in accordance with error information.

One example of a thread servo will be described with reference to FIG. 1.

A disk 1, while being rotated by a spindle motor 61, is irradiated with a laser beam emitted from an optical head 62 for recording or reproducing data in or from the disk 1. Information composed of light reflected from the disk 1 is detected and is then supplied to a RF amplifier 64.

The RF amplifier 64 converts the reflected light information (or a current signal corresponding to light quantity) into a voltage value, and also performs a matrix calculation of the reflected light information to extract, from the reflected light information, information necessary for a wide variety of servo operations as well as a reproducing operation.

With respect to a thread error signal used for a thread servo loop, there is known, for example, a method of producing a thread error signal by extracting a low frequency component from a tracking error signal used for a tracking servo through a low pass filter. This is because a thread error signal may be composed of a signal indicating the amount of offset between the entire optical head 62 and an objective lens driven for tracking by a biaxial mechanism in the optical head 62.

For example, in the thread servo shown in FIG. 1, a position error signal generating unit 65 receives a tracking error signal outputted from the RF amplifier 64, and extracts a low frequency component from the tracking error signal to generate a thread position error signal SLEp.

A position control signal generating unit 66 receives the thread position error signal SLEp from the position error signal generating unit 65, and generates a thread position control signal CSLp for driving the thread mechanism 63. The thread position control signal CSLp is converted, at a thread driver 67, into a thread drive signal SLD to be actually applied to a thread motor in the thread mechanism 63. The thread mechanism 63 is thus driven on the basis of the thread drive signal SLD, to move the optical head 62 to a specific position in the radial direction of the disk 1.

A tracking error signal shown in FIG. 2C is supplied to a low pass filter, to generate a thread position error signal SLEp shown in FIG. 2B. In addition, the thread position error signal SLEp shown in FIG. 2B, which is a low frequency component extracted from the tracking error signal through the low pass filter, has a phase delay relative to the tracking error signal.

The thread position error signal SLEp indicates an irradiation angle of a laser beam emitted from the optical head 62 relative to the disk plane. To adjust such an irradiation angle at a right angle, the slide mechanism 63 slides the optical head 62 in the direction in which the thread position error signal SLEp becomes zero.

For this purpose, the position control signal generating unit 66 outputs the thread position control signal CSLp shown in FIG. 2A on the basis of the thread position error signal SLEp. The thread drive signal SLD is generated on the basis of the thread position control signal CSLp.

Such a thread servo, however, has a problem that thread movement is liable to be made unstable, and is thereby frequently out of control, leading to a runaway state.

In the case where thread driving is performed on the basis of the thread position control signal CSLp generated from the thread position error signal SLEp, the thread driving should be theoretically performed depending on the thread position error signal SLEp even if such a thread position error signal SLEp is a significantly small value; however, since there exists a dead zone of about 1 V in the thread system, the thread mechanism 63 cannot be actually driven unless the thread drive signal SLD exceeds the dead zone voltage.

The dead zone voltage cannot be specified, and accordingly a voltage being considered to be sufficiently larger than the dead zone voltage is actually required to be applied.

As is apparent from the signal waveform example shown in FIG. 2C, with respect to a level of the tracking error signal, peak positions in the height direction in the figure are varied. This is because the peak positions of the tracking error signal is made unstable by an effect of the dead zone (dead zone voltage varied depending on electrical and mechanical characteristics of the thread system and the drive mechanism and also the thread position).

The effect of the dead zone actually makes it difficult to control linearly even a linear drive system and to make unstable operation of the linear drive system.

In the thread position control, runaway may most easily occur at the time of thread-on because a control target value is abruptly set at a position different from the present thread position.

FIG. 3 shows one example of a step response in position control.

As shown in this figure, when the thread mechanism is driven from the time of thread-on to a specific converged value, there frequently occurs an over-shoot or ringing indicated by a broken line because of a phase delay of the control loop. That is, the thread mechanism is out of control, to thus enter in a runaway state.

To realize a stable thread servo by solving the above-described runaway, there may be considered a thread servo shown in FIG. 4.

The thread servo shown in FIG. 4 has a velocity sensor 68 for detecting a moving velocity of the thread mechanism 63. Thus, the thread position error signal SLEp and velocity information from the velocity sensor 68 are supplied to a circuit unit as a velocity control signal generating unit 69.

The velocity control signal generating unit 69 sets a target velocity corresponding to a movement amount to a target position on the basis of the thread position error signal SLEp, and obtains a thread velocity error from a difference between the target velocity and the present velocity.

The velocity control signal generating unit 69 generates a thread velocity control signal CSLv corresponding to the thread velocity error signal, and supplies it to a thread driver 67.

In other words, the thread servo has a double loop configuration of a loop depending on a position error and a loop depending on a velocity error, in which the velocity error becomes zero when the position error becomes zero and such a point becomes a converged point.

With the thread servo having the double loop configuration depending on a position error and a velocity error, thread operation is controlled even in terms of its velocity, to prevent runaway, thus stabilizing the thread servo.

The above-described thread servo, however, has a problem. To obtain velocity information, the thread servo adopts a thread mechanism using a velocity sensor having a linear motor, or in the case where the thread servo adopts a thread mechanism using a gear system, the thread mechanism requires a double-phase sensor and a velocity signal generating circuit. As a result, the thread servo requires expensive parts and is complicated in its mechanism and its circuit configuration.

SUMMARY OF THE INVENTION

An object of the present invention is to provide a disk drive system including a thread servo having a simple and inexpensive configuration and being capable of preventing an unstable operation.

To achieve the above object, according to the present invention, there is provided a disk drive system including: a slide servo means for receiving an error signal of said slide mechanism and generating a slide drive signal on the basis of the error signal, thereby driving said slide mechanism; and a drive releasing means for detecting a precursory phenomenon of making unstable operation of said slide mechanism, and stopping a driving operation of said slide mechanism by said slide servo means upon detection of the precursory phenomenon.

A state in which the possibility of occurrence of runaway due to an over-shoot or ringing is high can be detected by monitoring a thread moving state or the like, and when such a state is detected, the drive releasing means stops the driving operation of the slide mechanism by the slide servo means for allowing the thread mechanism to run only by its inertia force, thereby avoiding occurrence of runaway. And, after an elapse of a specific time, the driving operation of the slide mechanism by the slide servo means is started again, so that the slide mechanism can be stably converged.

DETAILED DESCRIPTION OF TEE PREFERRED EMBODIMENTS

Hereinafter, one embodiment of a disk drive system of the present invention will be described with reference to the accompanying drawings.

Figure 5:
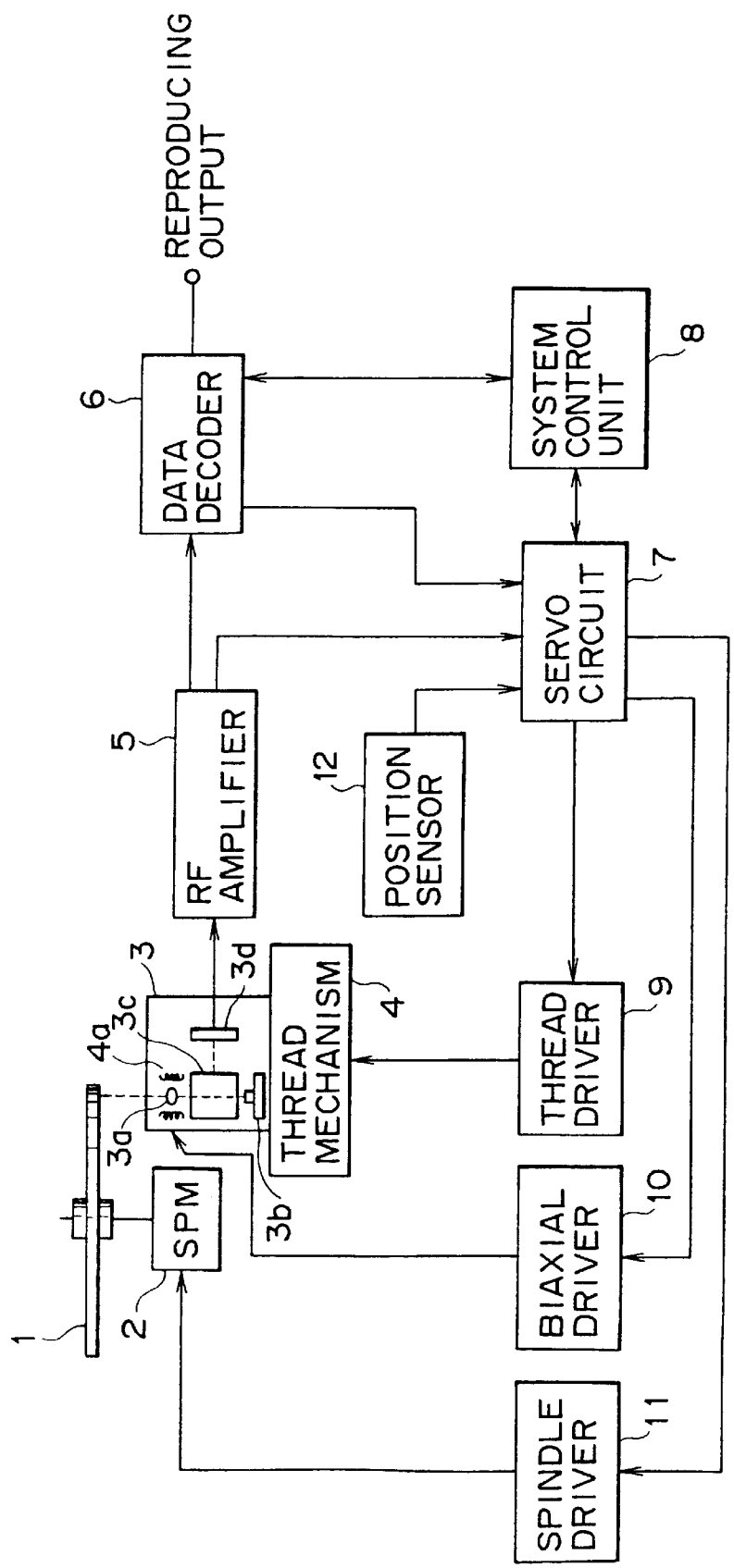
FIG. 5 is a block diagram showing one embodiment of a disk drive system of the present invention;.

FIG. 5 shows a schematic configuration of one embodiment of a reproducing system and a thread servo of the disk drive system of the present invention.

Referring to FIG. 5, an optical disk 1, which is of, for example, a CD type, is rotated by a spindle motor 2. Information recorded in the disk 1 is read out by an optical head 3. In the optical head 3, a light beam outputted from a semiconductor laser 3b is irradiated as a beam spot on a recording face of the disk 1 from an objective lens 3a through an optical system 3c composed of a diffraction lattice, a beam splitter, a quarter-wave plate, and the like. The light reflected from the recording face of the disk 1 is introduced into a detector 3d by an optical system 3b, to obtain information used for reproducing of data and servo operations.

The objective lens 3a is supported by a biaxial mechanism 4a. The biaxial mechanism 4a is capable of displacing the objective lens 3a in the direction of moving the objective lens 3a close to or apart from the disk 1 and in the radial direction of the disk 1 for performing focus control and tracking control of a beam spot. The entire optical bead 3 is configured to be slid in the radial direction of the disk 1 by a thread mechanism 4.

The thread mechanism 4 slidably supports the optical head 3 with a rack/pinion gear mechanism or a lead screw mechanism. When a thread motor in the thread mechanism is driven, a drive force thereof is transmitted to the gear system to move the optical head 3. As the thread mechanism 4, there may be adopted a linear motor mechanism for moving the optical head 3.

Information detected by the detector 3d in the optical head 3 and ouputted as a current signal corresponding to a liquid quantity is processed in terms of current/voltage conversion, calculation, amplification, and the like in a RF amplifier 5, to extract, from such information, a tracking error signal, a focus error signal, and the like together with reproducing information as main data.

The reproducing information is supplied to a data decoder 6, being processed in terms of error correction, demodulation and the like, and is reproduced and outputted.

Further, a reproducing clock for demodulation and information on rotational velocity of the spindle motor 2 are generated on the basis of a pulse generated from the reproducing information at a PLL circuit. The information on the rotational velocity of the spindle motor 2 is compared with information on a basic velocity, to generate a spindle error signal which is then supplied to a servo circuit 7.

The servo circuit 7 controls operation of a spindle driver 11 on the basis of the spindle error signal, and it allows the spindle motor 2 to carry out spindle rotation of, for example, a CLV (Constant Linear Velocity) type.

The tracking error signal and the focus error signal outputted from the RF amplifier 5 are supplied to the servo circuit 7, being processed in terms of phase compensation and the like at the servo circuit 7, and are supplied as a tracking control signal and a focus control signal to a biaxial driver 10 for driving a biaxial mechanism 4a. A drive signal outputted from the biaxial driver 10 is applied to a tracking coil and a focus coil of the biaxial mechanism 4a in the optical head 3 so that the objective lens 3a is moved in the tracking direction and the focus direction in which the error signals become zero.

Further, a low frequency component is extracted from the tracking error signal at a system control unit (or servo controller) 8, to generate a thread error signal.

As will be described later, a thread position control signal CSLp is generated on the basis of the thread error signal, and a thread drive signal SLD is outputted from a thread driver 9. The thread drive signal SLD is applied to a thread motor in the thread mechanism 4 for performing thread movement.

To detect a position of the thread mechanism 4, a position sensor 12 composed of an optical sensor or the like is provided, and an output from the position sensor 12 is supplied to the servo circuit 7 and is used for operation of preventing runaway which will be described later.

The system control unit 8 composed of a microcomputer outputs an operation control signal to each unit. For example, the system control unit 8 controls the servo circuit 7 in terms of loop opening/closing of each servo and of application of a spindle accelerating pulse/decelerating pulse. The reproducing operation is entirely controlled with these controls by the system control unit 8.

Figure 6:
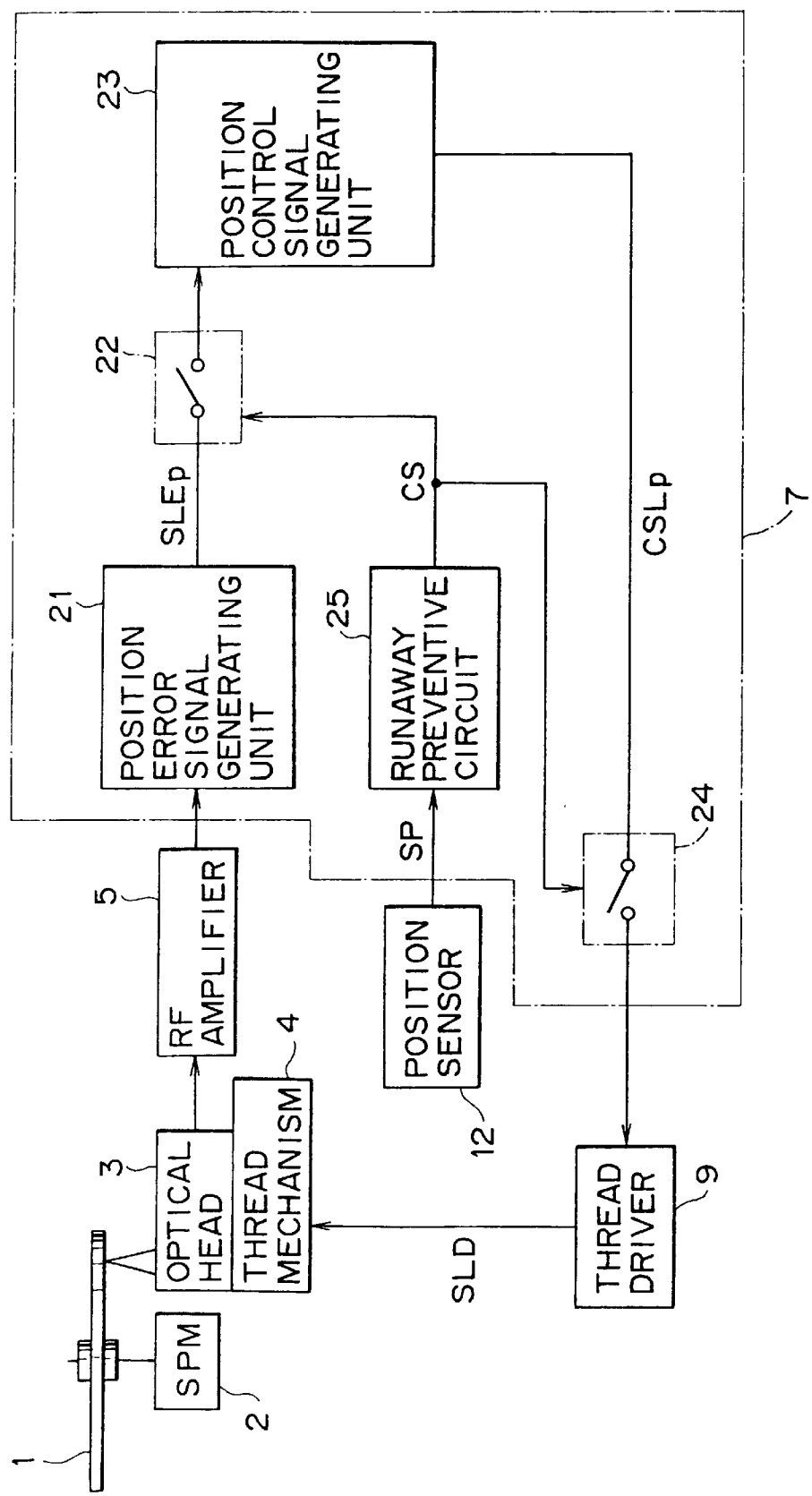
FIG. 6 is a block diagram showing one embodiment of the thread servo of the present invention.

A thread servo in such a disk drive system is shown in FIG. 6.

A configuration for thread servo in the servo circuit 7 has a thread position error signal generating unit 21, a switch 22, a thread position control signal generating unit 23, a switch 24, and a runaway preventive circuit 25.

The thread position error signal generating unit 21 extracts a low frequency component from a tracking error signal supplied, for example, from the RF amplifier 5 and outputs a thread position error signal SLEp. The thread position error signal SLEp is supplied to the thread position control signal generating unit 23 through the switch 22.

Figure 7:
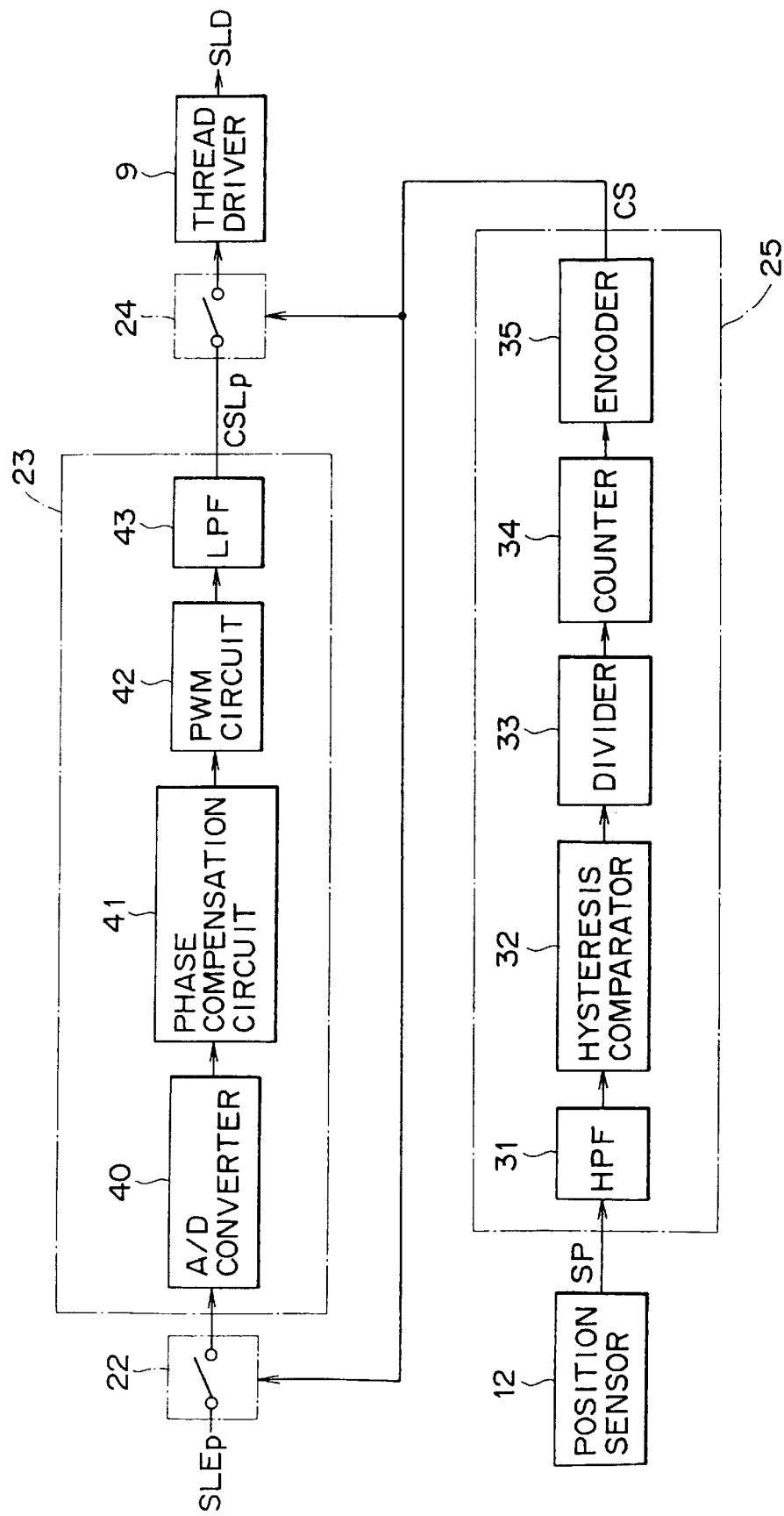
FIG. 7 is a block diagram showing one embodiment of an essential portion of the thread servo shown in FIG. 6.

A shown in FIG. 7, the thread position control signal generating unit 23 composed of a digital servo processor or the like has an A/D converter 40, a phase compensation circuit 41, a PWM (Pulse Width Modulation) circuit 42, and a low pass filter 43.

The thread position error signal SLEp inputted in the thread position control signal generating unit 23 is converted into digital data at the A/D converter 40, being processed in terms of phase compensation at the phase compensation circuit 41, and is then converted into a PWM (Pulse Width Modulation) signal, that is, a signal having a pulse width corresponding to a position error amount at the PWM circuit 42. Such a PWM signal is converted into a thread position control signal CSLp as an analog voltage value at the low pass filter 43, and is outputted from the thread position control signal generating unit 23.

It should be noted that, the low pass filter 43 is disposed in the position control signal generating unit 23 in FIG. 7 for convenience; however, in the case of using the digital servo processor, the digital servo processor may be often configured that the A/D converter 40, phase compensation circuit 41, and PWM circuit 42 are formed in a DSP chip as a servo processor, and the low pass filter 43 is connected to the DSP chip as a circuit subsequent to the DSP chip.

In addition, the thread position control signal generating unit 23 may be configured to be of an analog type. In this case, the A/D converter 40 and the PWM circuit 42 shown in FIG. 7 can be omitted.

The position control signal generating unit 23 outputs the thread position control signal CSLp to the thread driver 9 through the switch 24. The thread driver 9 generates a drive signal SLD corresponding to a voltage value of the thread position control signal CSLp and applies it to the thread mechanism 4.

Figure 1:
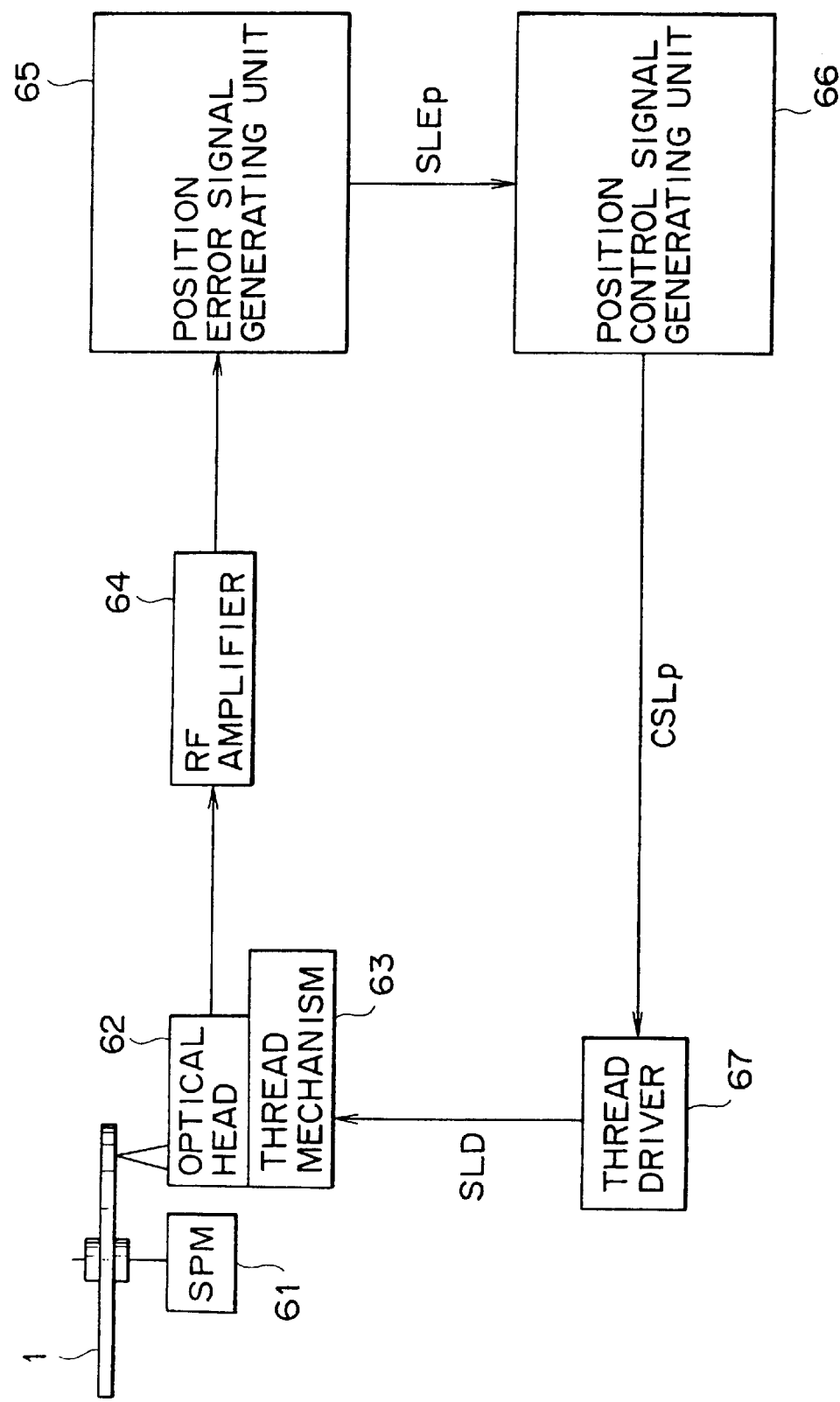
FIG. 1 is a block diagram showing one example of a thread servo.
Figure 2:
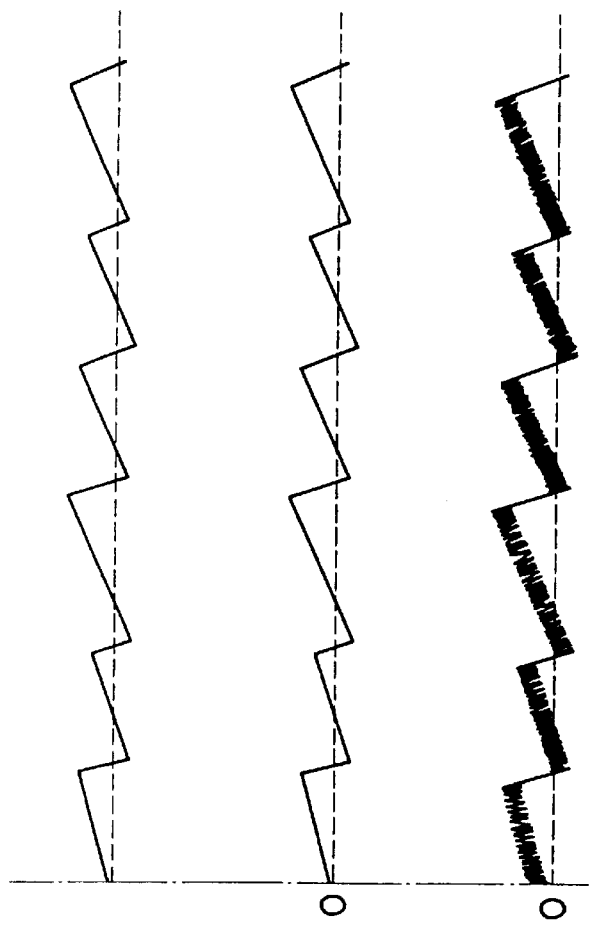
FIGS. 2A to 2C are views each illustrating one example of a thread control signal.

The thread servo having such a feedback configuration in this embodiment has not a loop of detecting and feeding-back a thread movement velocity as described with reference to FIG. 4 but has basically only a feedback loop based on a position error as described with reference to FIG. 1. Accordingly, as described with reference to FIG. 3, in this thread servo, there is a high possibility of occurrence of runaway, and to realize stabilization of servo control by preventing occurrence of runaway, this thread servo is provided with a runaway preventive circuit 25.

In the thread servo in this embodiment, the switches 22 and 24 are usually left turned on so that the thread servo loop functions. When the runaway preventive circuit 25 detects a precursory phenomenon of an over-shoot or ringing as one thread action, it outputs a control signal CS for turning off the switches 22 and 24. The turn-off of the switches 22 and 24 on the basis of the control signal CS releases the thread servo loop, that is, stops the servo driving operation of the thread mechanism 4. At this time, the thread mechanism 4 moves the optical head 3 only by an inertia force thereof.

As shown in FIG. 7, the runaway preventive circuit 25 includes, for example, a high pass filter 31, a hysteresis comparator 32, a frequency divider 33, a counter 34, and an encoder 35.

Figure 3:
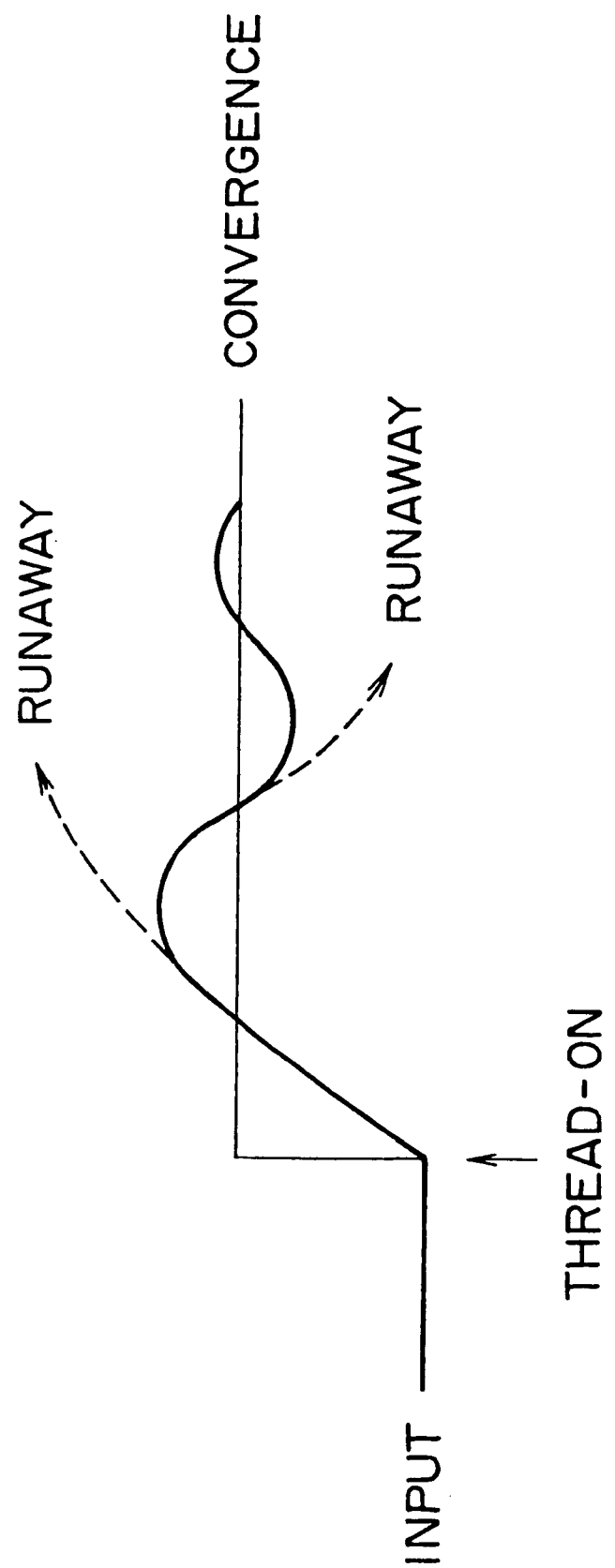
FIG. 3 is a view illustrating a runaway state of the thread servo shown in FIG. 1.

An output SP from the position sensor 12 is supplied to the runaway preventive circuit 25. The position sensor 12 is composed of a simple optical sensor for outputting a signal corresponding to a moving position of the optical head 3 which is moved by the thread mechanism 4. The sensor output SP upon thread movement is, for example, shown in FIG. 8A. When the optical head 3 is moderately moved by thread operation, the sensor output SP exhibits a signal waveform of a low frequency. When the optical head 3 is rapidly moved by thread operation, the sensor output SP exhibits a signal waveform of a high frequency. The detection of a precursory phenomenon of runaway, which is required for the runaway preventive circuit 25, will be described below. The runaway, as shown in FIG. 3, occurs at the time when thread movement is abruptly performed and cannot be converged. From this viewpoint, in the runaway preventive circuit 25, the sensor output SP is allowed to pass through the high pass filter 31 for cutting off a low frequency component from the sensor output SP. In other words, only the component of the sensor output SP observed when the thread movement is abruptly performed is extracted. A high frequency component extracted from the sensor output SP having a waveform shown in FIG. 8A is, for example, shown in FIG. 8B.

Figure 8:
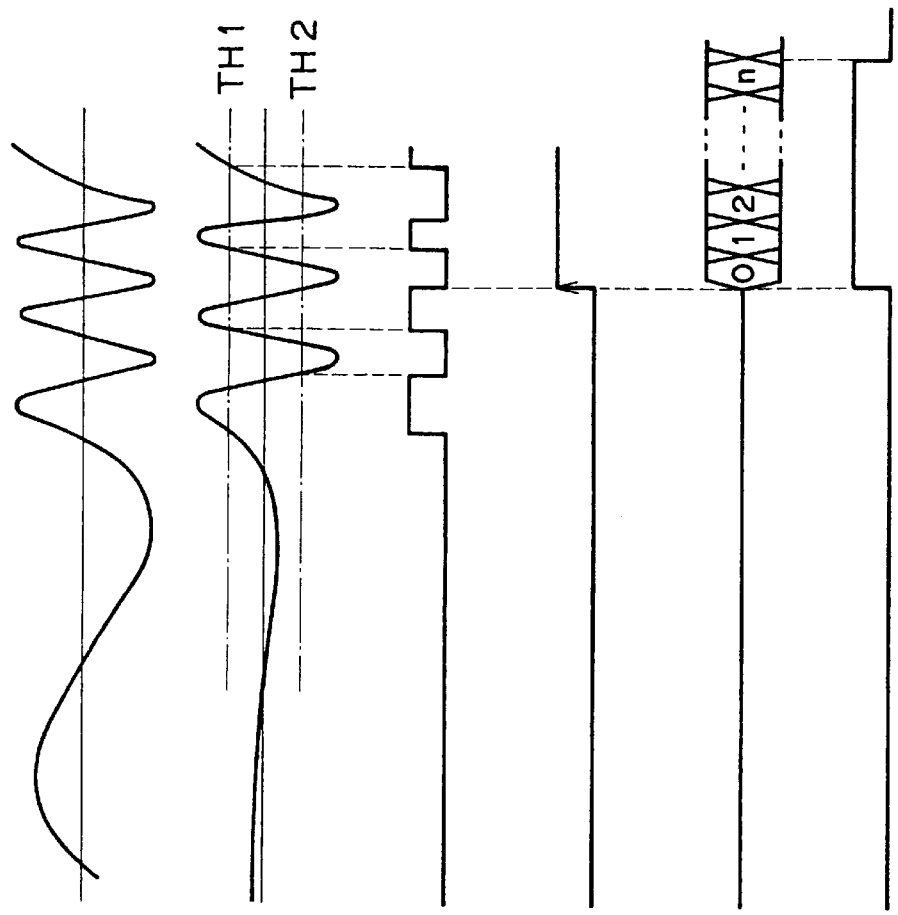
FIGS. 8A to 8F are waveform diagrams illustrating detection of a precursory phenomenon of runaway and generation of a control signal.

The output from the high pass filter 31 is compared with, for example, threshold values TH1 and TH2 at the hysteresis comparator 32, to form a comparison signal shown in FIG. 8C.

The threshold values TH1 and TH2 upon rising and falling of the amplitude are suitably set, and if the comparison signal formed on the basis of these threshold values TH1 and TH2 includes continuous generation of pulses, it means that thread movement is abruptly accelerated at a movement velocity more than a specific value, leading to occurrence of runaway at a high probability.

The frequency divider 33 divides the output frequency of the hysteresis comparator 32 into a plurality (for example, the integer "m") of parts, and when the frequency divider 33 detects that the above comparison signal includes continuous generation of the "m" pieces of pulses, it outputs a signal indicating a precursory phenomenon of runaway.

For example, assuming that the frequency divider 33 is composed of a two-division type circuit, when the frequency divider 33 detects that the output, that is, the comparison signal from the hysteresis comparator 32 includes continuous generation of two pulses, it outputs a rising signal shown in FIG. 8D.

The counter 34 starts resetting/counting operation on the basis of the output of the frequency divider 33.

To be more specific, the counter 34 starts to count on the basis of the rising signal supplied from the frequency divider 33 as shown in FIG. 8E, and outputs a count value to the encoder 35.

The encoder 35 outputs a control signal CS which is at a [H] level in a period, for example, from the count value [0] to the count value [n] as shown in FIG. 8F.

In other words, the state in which control signal CS is at the [H] level is continued in a specific period from the time when a precursory phenomenon of runaway is detected to the time of the count value [n].

The control signal CS is supplied to the switches 22 and 24. Thus, the switches 22 and 24 are turned off in the specific period from the time when a precursory phenomenon of runaway is detected to the time of the count value [n]. In such a period, the servo loop in released and thread movement is performed only by an inertia force of the thread mechanism. When the level of the control signal CS is returned to the [L] level after an elapse of the specific period, the switches 22 and 24 are turned on again, so that the servo loop functions and the thread movement by the servo loop is re-started.

Figure 9:
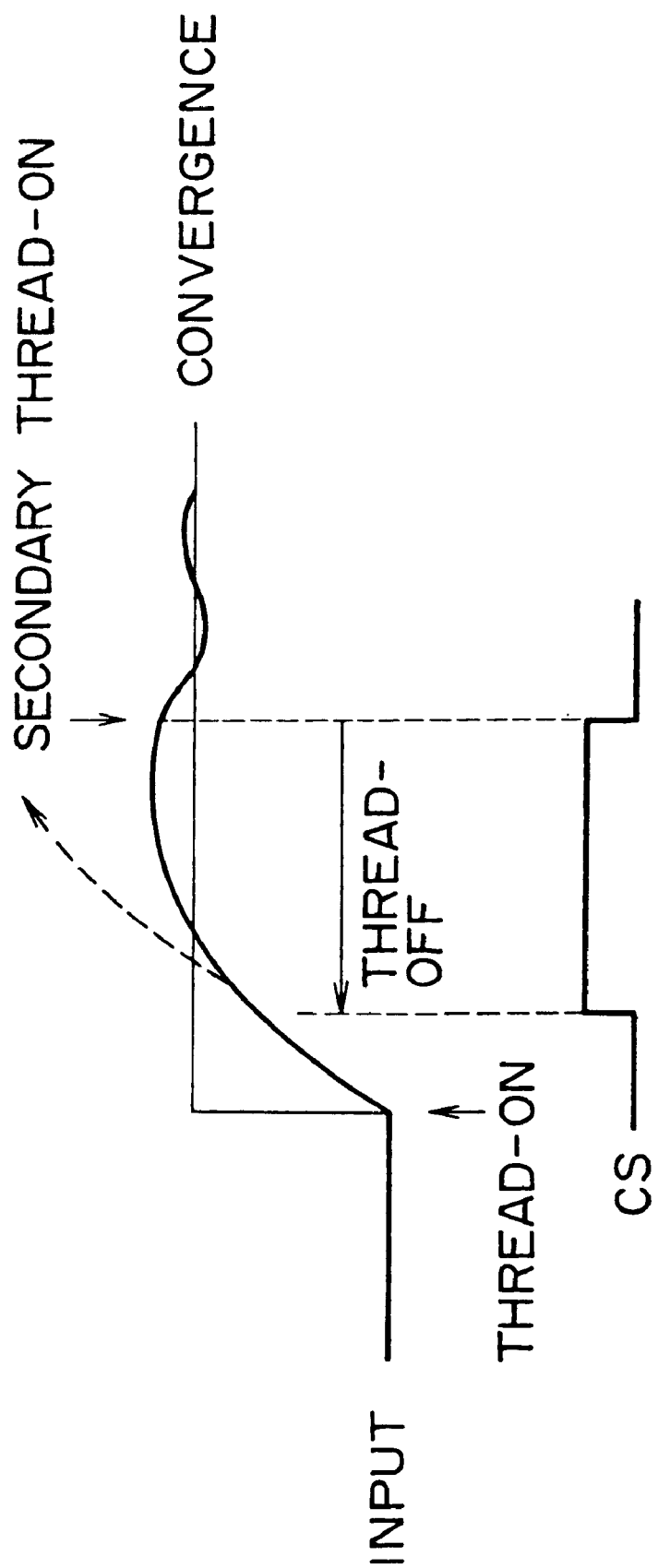
FIG. 9 is a view illustrating a state in which runaway is avoided according to the prevent invention.

The response of the thread servo in this embodiment is shown in FIG. 9.

For example, when a precursory phenomenon shown by a broken line in FIG. 9 is detected on the basis of the abrupt thread movement or the like, as shown in the figure, the thread servo drive is stopped in the period in which the control signal CS is at the [H] level. During such a period in which the thread servo drive is stopped, the thread movement is performed only by the inertia force of the thread mechanism, so that the thread mechanism is not accelerated to the runaway state and remains near the convergence point (that is, the possibility of occurrence of runaway becomes significantly small). After that, by starting the thread servo again, the thread mechanism is desirably converged at the convergence point. In summary, the servo operation is stopped at the time when the possibility of occurrence of runaway becomes higher for avoiding occurrence or runaway, and thereafter, the servo operation is started again, to complete the movement of the thread mechanism toward the target position.

In the case where the initial value is very apart from the target converged value, the operations shown in FIG. 9 may be repeated several times, to similarly avoid occurrence of runaway.

Figure 4:
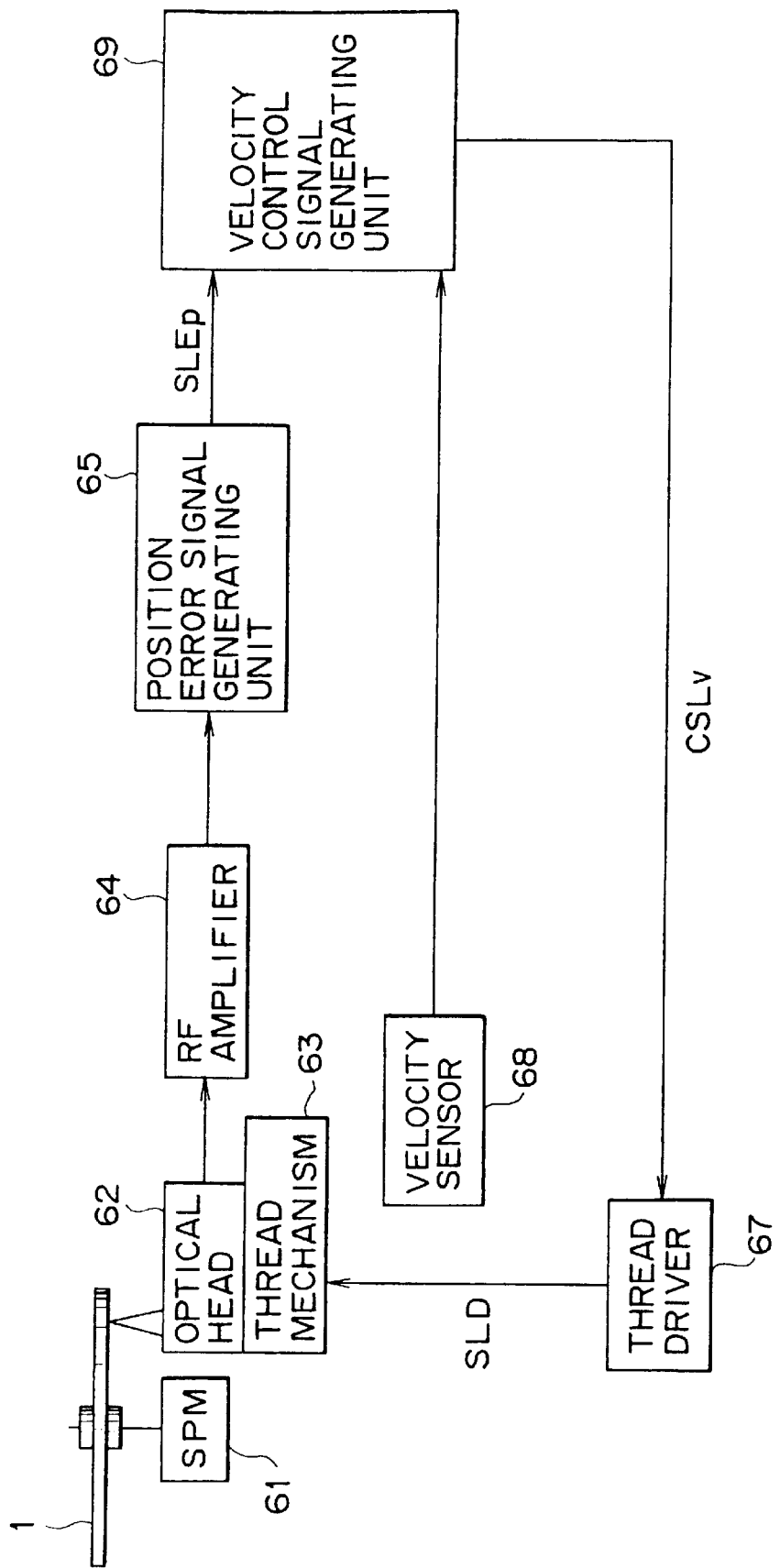
FIG. 4 is a block diagram showing another example of the thread servo.

In this embodiment, as described above, it is possible to avoid occurrence of runaway without the need of provision of the double loop configuration including the velocity loop shown in FIG. 4, and hence to provide a simple, stable thread servo without use of an expensive device such as a velocity sensor.

The thread servo in this embodiment, which does not require a means for lowering a servo gain for avoiding occurrence of runaway, is allowed to realize the thread drive with a suitable servo gain.

The cut-off frequency at the high pass filter 31, the threshold values at the hysteresis comparator 32, the division ratio at the frequency divider 33, and the count value at the counter 34 on the basis of which the encoder 35 returns the level of the control signal CS to the [L] level, may be selected at optimum values at the time of design of the thread servo.

The runaway preventive circuit 25 may be of course configured differently from that shown in FIG. 7.

Although the servo loop is cut off at two points, that is, at the switches 22 and 24 in this embodiment, the cut-off of the serve loop may be configured that at least one switch is provided in the serve loop and the switch is turned on/off on the basis of the control signal CS.

Figure 10:
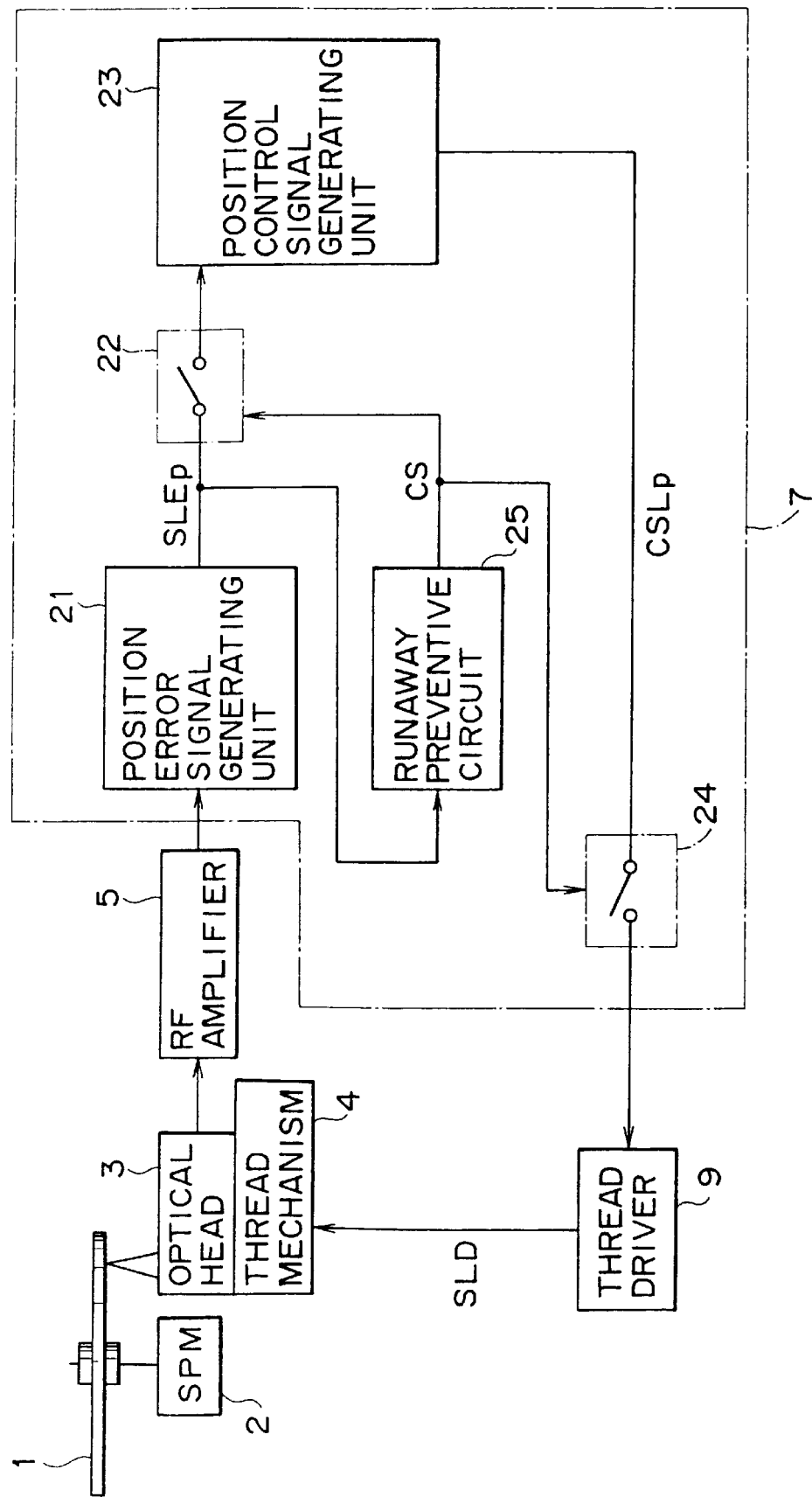
FIG. 10 is a block diagram showing a further embodiment of the thread servo of the present invention.

FIG. 10 shows another embodiment of the thread servo of the present invention. In this figure, parts corresponding to those shown in FIG. 6 are indicated by the same characters as those shown in FIG. 6, and the explanation thereof is omitted.

In this embodiment, the position sensor 12 is not provided, and the runaway preventive circuit 25 detects a precursory phenomenon of runaway on the basis of the thread position error signal SLEp.

The thread position error signal SLEp, which is error information relative to a target position, is abruptly changed when the thread movement is abruptly performed.

For example, when a state in which a variation in the thread position error signal SLEp detected for unit time is more than a specific value (or a state in which such a variation is more than the specific value is continuously observed) is detected, such a state is decided as a precursory phenomenon of runaway. Then, as described with reference to FIG. 7, the counter starts counting operation on the basis of a signal indicating the precursory phenomenon of runaway, and the encoder generates a control signal CS which is at the [H] level in a specific period. Thus, like the previous embodiment, when the possibility of occurrence of runaway becomes very high, the switches 22 and 24 are turned off, so that thread movement is performed only by the inertia force of the thread mechanism. The thread servo drive is started again after an elapse of a specific period in which the possibility of occurrence of runaway becomes very low, and thereby the thread mechanism is preferably converged to a target position.

In this way, by detecting a precursory phenomenon of runaway using the thread position error signal SLEp, it is possible to eliminate the need of provision of the position sensor shown in FIG. 6, and hence to provide the thread servo with a more simple and inexpensive configuration.

In addition to the above thread position error signal SLEp, the precursory phenomenon of runaway can be detected on the basis of a tracking error signal or a viewing angle signal equivalent to a viewing angle position of the objective lens 3a.

Although description has been made using the thread mechanism for moving the relative position of the optical head 3 to the disk 1 by moving the optical head 3 in the above embodiments, the present invention can be also applied to a slide mechanism for moving a relative position of the optical head 3 to the disk 1 by sliding a turn table on which the disk 1 is mounted through transmission of a rotating force of a slide motor to a rack/gear provided On the turn table.

As described above, when a precursory phenomenon of making unstable an operation of a slide mechanism is detected, operation for driving the slide mechanism by a slide servo means is stopped, and consequently, it is possible to ensure a stable operation of the slide mechanism without the need of provision of a feedback configuration particularly on the basis of detection of a sliding velocity as a servo configuration. This is effective to realize a simple, inexpensive slide servo which is stable by suppressing the possibility of occurrence of runaway.

Further, a drive releasing means stops the driving operation of the slide mechanism by the slide servo means in a period in which the possibility of occurrence of runaway is high and starts again the drive operation after an elapse of a specific time since stoppage of the drive operation, and consequently, the drive releasing means allows the slide mechanism to be efficiently converged after avoiding occurrence of runaway.

While the preferred embodiments of the present invention have been described using specific terms, such description is for illustrative purposes only, and it is to be understood that changes and variations may be made without departing the spirit or scope of the following claims.

What is claimed is:

1. A disk drive system having a slide mechanism for displacing a relative position of an optical head portion to a disk-shaped recording medium in the radial direction of said recording medium so as to record or reproduce information in or from said recording medium, comprising:

a slide servo means for receiving an error signal of said slide mechanism and generating a slide drive signal on the basis of the error signal, thereby driving said slide mechanism; and a drive releasing means for detecting a precursory phenomenon of making unstable operation of said slide mechanism based on the error signal, and stopping a driving operation of said slide mechanism by said slide servo means upon detection of the precursory phenomenon, wherein said drive releasing means starts again continuously the driving operation of said slide mechanism after allowing an inert movement of the slide mechanism thereof and after an elapse of a specific time since stoppage of the driving operation of said slide mechanism by said slide servo means.

2. The disk drive system according to claim 1, further comprising:

a position sensor for detecting a position of said slide mechanism;

wherein said drive releasing means detects the precursory phenomenon of making unstable the operation of said slide mechanism on the basis of a moving state of said slide mechanism detected by said position sensor.

3. A disk drive system having a slide mechanism for displacing a relative position of an optical head portion to a disk-shaped recording medium in the radial direction of said recording medium so as to record or reproduce information in or from said recording medium so as to record or reproduce information in or from said recording medium, comprising:

a position sensor for detecting a position of said optical head displaced by said slide mechanism and for outputting a signal corresponding to moving position of said optical head, a slide servo means for generating a slide drive signal based on the signal from said position sensor, thereby driving said slide mechanism, a detector for detecting a precursory phenomenon of making unstable operation of said slide mechanism based on the signal from said position sensor; and a drive releasing means for stopping a driving operation of said slide mechanism by said slide servo means upon detection of the precursory phenomenon form said detector, wherein said drive releasing means starts again continuously the driving operation of said slide mechanism after allowing an inert movement of the slide mechanism thereof and after an elapse of a specific time since stoppage of the driving operation of said slide mechanism by said slide servo means.

4. The disk drive system according to claim 3, wherein said drive releasing means starts again the driving operation of said slide mechanism after an elapse of a specific time since stoppage of the driving operation of said slide mechanism by said slide servo means.

5. The disk drive system according to claim 4, wherein said slide mechanism moves the optical head only by an inertia force during from the stoppage of the driving operation of said slide mechanism by said slide servo means to the start again the driving operation of said slide mechanism.

\* \* \* \* \*